United States Patent [19]

Rauchi

[11] 4,307,645
[45] Dec. 29, 1981

[54] ELECTRONIC APPARATUS FOR TEACHING AND READING MUSIC

[75] Inventor: Francesco Rauchi, Ascoli Piceno, Italy

[73] Assignee: S. I. EL. S.p.A. Societa' Industrie Elettroniche, Acquaviva Picena, Italy

[21] Appl. No.: 186,605

[22] Filed: Sep. 12, 1980

Related U.S. Application Data

[63] Continuation-in-part of Ser. No. 125,441, Feb. 28, 1980, abandoned, which is a continuation of Ser. No. 8,795, Feb. 1, 1979, abandoned.

[30] Foreign Application Priority Data

Feb. 21, 1978 [IT] Italy .............................. 20480 A/78

[51] Int. Cl.³ .................... G10G 3/04; G10H 1/00; G09B 15/04
[52] U.S. Cl. ..................... 84/1.03; 84/1.01; 84/470 R; 84/462
[58] Field of Search ............ 84/1.01, 1.03, 470 R, 84/1.28, 462

[56] References Cited
U.S. PATENT DOCUMENTS

| | | | |
|---|---|---|---|
| 3,878,750 | 4/1975 | Kapps | 84/1.01 |
| 4,012,979 | 3/1977 | Wemelcamp | 84/1.01 |
| 4,054,868 | 10/1977 | Rose | 84/470 R |
| 4,089,246 | 5/1978 | Kooker | 84/1.03 |
| 4,098,165 | 7/1978 | Akiyama | 84/470 R |
| 4,202,235 | 5/1980 | Namiki et al. | 84/1.03 |
| 4,213,372 | 7/1980 | Sasaki et al. | 84/470 R |

Primary Examiner—Stanley J. Witkowski
Assistant Examiner—Forester W. Isen
Attorney, Agent, or Firm—Fidelman, Wolffe & Waldron

[57] ABSTRACT

An electronic apparatus for teaching and reading music comprises: a tone generator connected, via logic control gates, to a system for reproducing the sound; a keyboard for selecting the notes of the scale to be generated each key of which may be compared to a symbol of the corresponding note which is located on or adjacent to that key; and at least one set of control buttons for selecting the time duration of each scale or rest note, with each control button designated by a symbol of the time duration of the scale or rest note. Each key or button also has a corresponding electronic visual display (LED) to indicate its selection. A multichannel, pluriaddress, memory device is provided for WRITING-in and READING-out musical data. The apparatus also includes a mode selection switch with which to select operation of the device for reading or writing. A variable frequency generator sets the timing of the music to be played.

11 Claims, 3 Drawing Figures

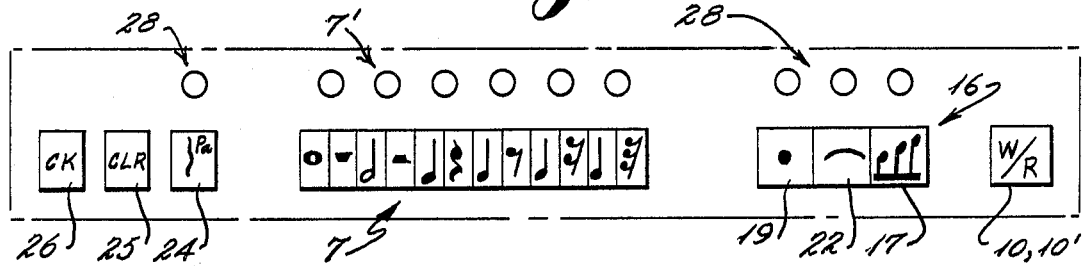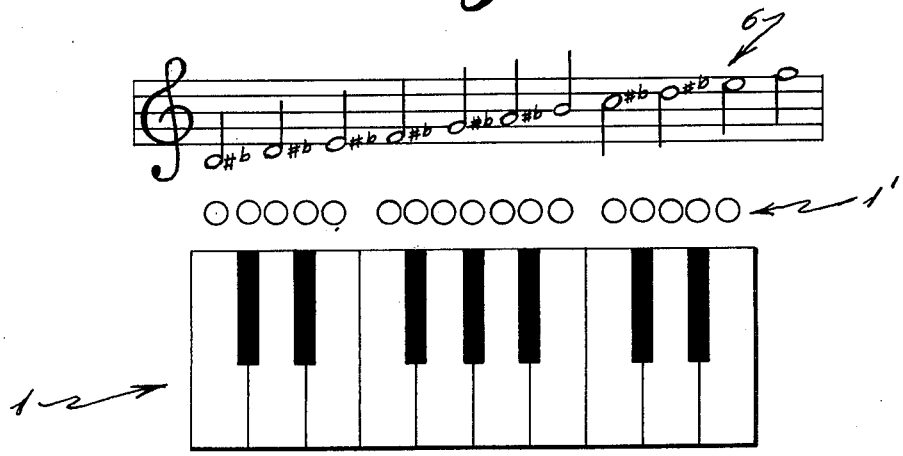

ELECTRONIC APPARATUS FOR TEACHING AND READING MUSIC

This application is a continuation-in-part of application Ser. No. 125,441 (now abandoned) filed Feb. 28, 1980 which, in turn, was a continuation of application Ser. No. 008,795 filed Feb. 1, 1979 (now abandoned).

BACKGROUND OF THE INVENTION

This invention relates to an electronic apparatus that is particularly suitable for teaching and reading music directly from musical scores of sheet music, instruction manuals, or the like.

DESCRIPTION OF THE PRIOR ART

For learning the general concepts of music, such as those concerning theory and solfeggio (the application of solfa syllables to a musical scale), conventional teaching systems require the assistance of a teacher to give the necessary explanation of the meaning of the various musical symbols and to check how much each student has learned. This causes considerable difficulty in the early stages of learning these concepts and thus renders the learning and reading of music a long and difficult procedure.

SUMMARY OF THE INVENTION

The object of the present invention is to provide a method and electronic apparatus by which it is possible to read music directly, by comparing the musical symbols of the sheet music with those on or associated with a keyboard and various control buttons located on the apparatus, and by making the appropriate selections.

The subject of the invention is thus, in general, an electronic apparatus of the aforementioned type that comprises: a keyboard for selecting the notes of the musical scale to be produced by a tone generator, each key of which may be compared to a symbol of the corresponding note which is located on or adjacent to that key; at least one set of control buttons for selecting the time duration of each scale or rest note; and a memory device of the multichannel, pluriaddress type of which some I/O channels are connected to the keyboard and to the inputs of a group of AND gates for selecting the notes to be generated, while other channels are connected to the control buttons as well as to a programmable counter/timer which is driven by a variable frequency generator. The apparatus also comprises a mode selection switch with which to select operation of the device for reading or writing.

For the purposes of the present invention, the terms "keyboard" or "key" have been used out of simplicity, though these terms may also be taken to mean any strips of keys, push-buttons, switches, or the like.

BRIEF DESCRIPTION OF THE DRAWINGS

The general use of the apparatus for teaching and reading music, according to the present invention, will now be explained while referring to the example given in the accompanying drawings, in which:

FIG. 2 is a view of the control buttons and associated indicators;

FIG. 3 is a view of the keyboard along with the corresponding musical symbols and indicators for the keys and buttons.

DETAILED DESCRIPTION OF THE DRAWINGS

Figure 1:
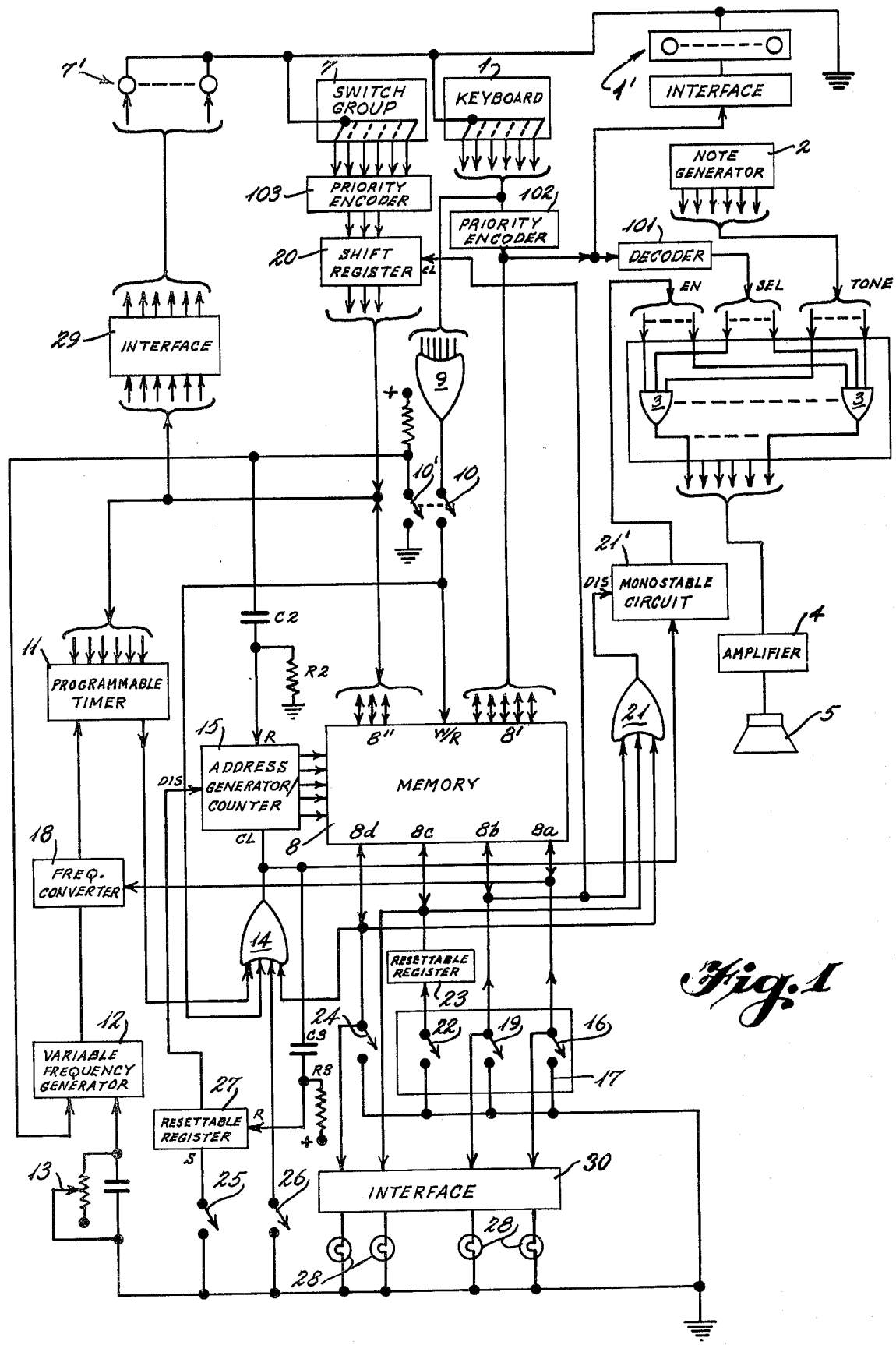
FIG. 1 is a general block diagram for the apparatus.

A detailed description of one embodiment of this invention follows. In this description, bidirectional data busses connect the various input/output channels of memory 8 to the other component parts of the device.

According to this embodiment of the invention, each word of memory is twelve bits in size and corresponds to each note to be played, with the various bits of each word determined by the appropriate I/O channel capacities. For instance, of the twelve bits of one word: channel 8' handles five bits; channel 8" handles 3 bits; and each of the channels 8a, 8b, 8c, and 8d handle one bit. Tone generator 2 supplies five different tones and is on during READ and WRITE operations.

Referring to FIG. 1, the keys of keyboard 1 are connected to the note data inputs of OR gate 9 (which may be considered to be a control signal generator) for providing a control signal output when a key of keyboard 1 is depressed. The output of keyboard 1 is also encoded by encoder 102 and connected to the selection inputs (SEL) of AND gates 3 through a suitable decoder 101 (for coded selection of the tones to be gated from tone generator 2 to loudspeaker 5). Further, a bidirectional data buss connects I/O channels 8' of multichannel, pluriaddress memory 8 to the output of encoder 102 and input of decoder 101.

Push-button group 7 is provided to select the time duration of the scale or rest notes called for in the sheet music. The output of group 7 is encoded by encoder 103 and connected, via shift register 20, to I/O channel 8" of memory 8. I/O channel 8" also is connected to programmable counter/timer 11 which is driven (during the READ mode) by frequency generator 12 for clocking of address generator/counter 15 via OR gate 14.

A "rest" push-button 24 is provided for use with group 7 when a rest note is called for by the sheet music. The output of button 24 is connected to the input of OR gate 14 for clocking of address generator/counter 15, as well as to I/O channel 8d of memory 8. By selecting the length of time required for a rest note (through selection of a push-button of group 7) and by pushing "rest" button 24, a pause in the music is allowed, as called for in the sheet music.

A ganged mode selection switch 10, 10' provides the means of selection of the apparatus for the READ or WRITE mode of operation. Switch part 10 (when closed) connects the control signal output of OR gate 9 to a control input W/R of memory 8 and to OR gate 14 for clocking of address generator/counter 15 at input CL. Switch part 10' (when closed) provides ground to and disables variable frequency generator 12 which, in turn disables a frequency converter 18 and programmable counter/timer 11. By opening the ganged mode selection switch part 10', variable frequency generator 12 is enabled and address generator/counter 14 is reset.

Another selection button group 16 is provided for musical alterations. In particular, a "triplet" or "tercet" function button 17 is connected to memory I/O channel 8a. I/O channel 8a also is connected to the alteration input of a frequency converter 18, with frequency converter 18 connected between the output of variable frequency generator 12 and the clock input (CL) of programmable counter/timer 11. Button 7 must be pushed for each note of the triplet during the WRITE mode of operation; the pertinent bit of data from memory I/O channel 8a controls frequency converter 18, during the READ mode of operation, to clock each note of the triplet at one-third of the normal time duration of that note.

A second push button 19, for the musical "point" or "hold", is connected to corresponding I/O channel 8b of memory 8 and to clock input CL of shift register 20 (located between push-button group 7 and the inputs of I/O channel 8"). Shift register 20, when clocked, increases the time duration of the selected button of group 7 by one-half. I/O channel 8" is also connected, via OR gate 21, to the disable input DIS of a monostable circuit 21'.

Monostable circuit 21' is connected between the clock input (CL) of address generator/counter 15 and the common enable inputs (EN) of the group of AND gates 3; this circuit 21' is necessary for disabling the group of AND gates 3 (for a short space of time) to thereby allow a break between the sound of two notes of the same pitch.

A third push-button 22, for the "value bind" or "ligature" function, is connected to the input of a resettable register 23 (which automatically resets every third clock pulse) whose output is connected, in turn, to I/O channel 8c of memory 8; I/O channel 8c also is connected, via OR gate 21, to the disable input DIS of monostable circuit 21'.

A "correction" push-button 25 is provided for correcting mistakes in the data to be entered into memory 8 during the WRITE mode of operation. Button 25 is connected to the disable input (DIS) of address generator/counter 15 through a resettable register 27 which is reset by the next clock pulse out of OR gate 14. For instance, when a note is selected at keyboard 1 and the time duration of that note is selected at push-button group 7, the next address of memory into which that note data and time data will be stored is clocked into address generator/counter 15. To correct this data, new data must be selected at keyboard 1 and push-button group 7; but the selection of the new data would clock address generator/counter 15 to the next address and would not correct the mistake. Therefore, address generator/counter 15 must be disabled at the present address. This is accomplished by closing button 25 to disable the address register 15. The new data entered will clock address generator 15 and reset register 27 by the clock pulse out of OR gate 14, thereby allowing correction of the data to be input to that address of memory.

A "step-by-step verification" of the music to be played may be accomplished, in the READ mode of operation, at the speed which is desired by the operator. By adjusting rheostat 13 so that variable frequency generator has no output, the reading operation may be clocked manually by means of push-button 26.

The apparatus includes suitable illuminated visual displays (LED's) 7', 28 which are electrically connected to push-button groups 7 and 16. These signal devices 7', 28 are connected through respective interfaces 29 and 30. Additionally, LED display group 1' may be used in conjunction with keyboard 1. The appropriate LED will light-up for each key or push-button actuated—during both READ and WRITE modes of operation.

The apparatus as described can be constructed for use as an independent unit or can be fitted to or incorporated in electronic musical instruments provided with keys and a rhythm group, such as commercially available electronic organs. When used as part of these commercially available organs, variable frequency generator 12 may constitute the frequency generator for the rhythm group of such a musical instrument.

With reference now to both FIGS. 1 and 2, a brief description will be given of the fundamental operations necessary for using the musical apparatus, both in the writing and reading modes.

With sheet music or the like that one wants to read and listen to, but without having a knowledge of the meaning of the various musical symbols (or only having a very limited knowledge of these symbols), a person can proceed through a comparison of the symbols written on the sheet music with those associated with keyboard 1 and push-button groups 7 and 16 of the apparatus, as follows;

WRITING OPERATION

Close ganged mode selection switch 10, 10' to set the apparatus to the WRITE mode; in this mode, programmable counter/timer 11, frequency converter 18, and variable frequency generator 12 are disabled. Then, through a comparison of symbols of the sheet music and symbols of the apparatus (commencing with the first note shown on the piece of music to be read), depress the push button of switch group 7 that corresponds to the time duration of the scale or rest note. Depression of a push-button of group 7 inputs time data to memory 8 via I/O channel 8".

Next, in the case of a scale note, select the corresponding note key of keyboard 1 through a comparison of the symbols of the sheet music and the symbols associated with each key of the keyboard. Each time a key of keyboard 1 is depressed, address generator/counter 15 is clocked to access the next address in memory 8, and note data is input to memory 8 via I/O channel 8'. However, if the appropriate symbol on the sheet music is a rest note, push-button 24 (instead of a key of keyboard 1) must be depressed along with the appropriate push-button of switch group 7 that indicates the time duration of that symbol. Actuation of push-button 24 also clocks address generator/counter 15.

By proceeding to the subsequent symbol on the sheet music and repeating the above operations, until the piece of music in question has been completed, the appropriate data will be written into the corresponding address of memory via the appropriate I/O channels of memory 8.

The instructions given above also apply in the event that there are alterations to be made such as those indicated on the push-buttons of group 16. In particular, to write or store the "value bind" or "ligature" function depress push-button 22 (which, like the other buttons of this group, has the corresponding symbol reproduced on the face of the push-button). The appropriate data bit is written into memory 8 via I/O channel 8c.

To write the "point" or "hold" function as called for by the sheet music, depress push button 19 to send a data bit to memory 8, via I/O channel 8b, and to the clock input (CL) of shift register 20, to increase (by one-half) the time duration of the previously written note.

To write the "triplet" or "tercet" function, depress push-button 17 to send the relevant information to memory device 8, via I/O channel 8a. Push-button 17 must be depressed for each of the notes belonging to the "triplet".

READING OPERATION

To read out the information in memory and play the selected tunes, open ganged mode selection switch 10, 10'. Address generator/counter 15 is reset and variable frequency generator 12 is enabled (thereby enabling frequency converter 18 and timer 11). Frequency generator 12 drives timer 11 which is programmed by the information coming from I/O channel 8" of memory device 8. In this way, timer 11 clocks address generator/counter 15 at the frequency coming from variable frequency generator 12 and allows a step-by-step memory address exploration to be performed in accordance with the exact reading of the previously written data and in a fashion that is harmonically and rhythmically faithful to the piece of music concerned. Likewise, output signals from memory 8, via I/O channels 8', are transmitted to the SEL inputs of AND gates 3. Data accessed from memory 8 (via I/O channels 8b, 8c, and 8d) is fed through OR gate 21 to the disable input DIS of monostable circuit 21' to prevent the enabling of AND gates 3 and the passing of a signal from note generator 2 to the audio output. Data accessed from memory 8 (via I/O channel 8a) varies frequency convertor 18 to speed up the output timing of programmable counter/timer 11; this allows playback of the three notes of the "triplet" function in the time usually alloted for one note.

Each time that there is an input to OR gate 14 (with a subsequent output from OR gate 14 to clock the address generator/counter 15) monostable circuit 21' is enabled so that the EN inputs of the AND gates 3 are actuated; this allows a signal to pass from note generator 2, through the selected AND gate 3, to amplifier 4 and speaker 5.

As seen in FIG. 3, a visual display 6 of the notes of a scale are associated with and correspond to keyboard 1; under each symbol of visual display 6, is an illuminator 1' (i.e., LED) to indicate the corresponding note of the scale that is written into memory when a key of keyboard 1 is depressed and when that note is read out and played. Of course, each key of the keyboard could be lit, instead of having separate LED's.

The memory used is marketed by Motorola with part number MCM 6810 AP. The programmable timer is marketed by RCA with one of the following part numbers: CD 4018, CD 4059 and CD 4530.

It is obvious that, in FIG. 1, one particular embodiment has been given for the apparatus according to the invention and that, on the basis of the creative ideas given in the general principles as outlined above, the apparatus or a part thereof could also be constructed differently. For example, suitable encoding and decoding devices could be used advantageously in a memory device having a limited number of input/output channels, while maintaining a high data storage ability, without this in any way deviating from the framework of protection afforded to the invention. In addition, with appropriate coding and decoding, keyboard 1 could have more or less keys and tone generator 2 could furnish more or less tones.

What is claimed is:

1. An electronic apparatus for teaching and reading music, said apparatus comprising:
   a pluriaddress memory including an address input, a READ/WRITE control input, and plural input/output data channels each connected to a respective bidirectional data buss;
   a note keyboard and musical note symbols associated with keys of said keyboard, for selection of musical notes, said keys actuatable to output note data to a first bidirectional data buss;
   first switch means and associated symbols for selecting a time duration for the selected musical note and outputting time data, representative of the selected time duration, to a second bidirectional data buss;
   a plurality of AND gates, each gate having a TONE output, a SELECT input, and an ENABLE input, said TONE output fed to a speaker;
   a tone generator adapted to provide a plurality of tones to said TONE input;
   an address means for addressing said memory through said address input according to a clock input;
   a programmable counter/timer adapted to receive said time data from said first bidirectional data buss and, upon command, to clock said address means;
   a variable frequency generator adapted to drive said programmable counter/timer at a particular set frequency, upon command;
   a control gate having plural note data inputs and a control signal output, said control gate adapted to receive said note data from said keyboard and to provide a control signal to said output upon receiving said note data; and
   a mode selection means for receiving said control signal and for selecting a READ mode or a WRITE mode of operation of said apparatus; said mode selection means adapted to provide said control signal to said READ/WRITE control input of memory and to clock said address means when in said WRITE mode; said mode selection means further adapted to reset said address means and to enable said frequency generator when in said READ mode.

2. An apparatus as in claim 1, wherein said apparatus further comprises:
   a light display means actuatable by said keys and said first switch means for indicating said selected note data and said selected time data.

3. An apparatus as in claim 1, wherein said apparatus is incorporatable into an electronic musical instrument having a rhythm group with frequency generator, wherein said variable frequency generator comprises the frequency generator of said rhythm group.

4. An apparatus as in claim 1, wherein said apparatus further comprises:
   a frequency converter means for altering the output frequency of said frequency generator to said counter/timer upon command during said READ mode of operation.

5. An apparatus as in claim 4, wherein said apparatus further comprises:
   a triplet function selection means for selecting and supplying triplet data to said memory via a third bidirectional data buss during said WRITE mode, said memory adapted to supply said triplet data to said frequency converter to alter the output frequency of said frequency generator during said READ mode of operation.

6. An apparatus as in claim 1, wherein said apparatus further comprises:
   an electronic circuit means, actuated upon command, for disabling said AND gates.

7. An apparatus as in claim 6, wherein said apparatus further comprises:
- a shift register means, actuated upon command, for altering said time data;
- a point function selection means for selecting and supplying point data to said memory via a fourth bidirectional data buss and for actuating said shift register means during said WRITE mode of operation, said memory adapted to actuate said electronic circuit means during said READ mode of operation.

8. An apparatus as in claim 6, wherein said apparatus further comprises:
- a ligature function selection means for selecting and supplying ligature data to said memory via a fifth bidirectional data buss during said WRITE mode, said memory adapted to actuate said electronic circuit means during said READ mode.

9. An apparatus as in claim 6, wherein said apparatus further comprises:
- a rest function selection means for selecting and supplying rest data to said memory via a sixth bidirectional data buss during said WRITE Mode of operation and for clocking said address generator/counter during said WRITE mode, said memory adapted to actuate said electronic circuit means during said READ mode of operation.

10. An apparatus as in claim 1, wherein said apparatus further comprises:
- verification means for manual, step-by-step clocking of said address generator/counter during said READ mode of operation to verify the data in memory.

11. An apparatus as in claim 1, wherein said apparatus further comprises:
- correction means for correcting data to be entered into memory during said WRITE mode of operation.

* * * * *